United States Patent

James

[11] 3,890,257
[45] June 17, 1975

[54] YELLOW TO ORANGE DISAZO CATIONIC DYES CONTAINING TWO QUATERNARY AMMONIUM GROUPS

[75] Inventor: Daniel Shaw James, Hockessin, Del.

[73] Assignee: E. I. du Pont de Nemours and Co., Wilmington, Del.

[22] Filed: Sept. 19, 1973

[21] Appl. No.: 398,575

[52] U.S. Cl. .......... 260/148; 8/41 B; 260/152; 260/156; 260/175; 260/178; 260/179; 260/247.5 R; 260/268 R; 260/293.79; 260/295 AM; 260/326.85; 260/558 A; 260/567.6 M

[51] Int. Cl.. C09b 35/04; C09b 35/22; C09b 35/26

[58] Field of Search .......... 260/174, 148, 177, 184, 260/175, 186, 129

[56] References Cited
UNITED STATES PATENTS

| | | | |
|---|---|---|---|
| 2,945,849 | 7/1960 | Kruckenberg et al. | 260/185 |
| 3,074,926 | 1/1963 | Sartori | 260/191 |
| 3,086,003 | 4/1963 | Baumann et al. | 260/146 R |
| 3,133,910 | 5/1964 | Baumann et al. | 260/146 R |
| 3,148,181 | 9/1964 | Wallace et al. | 260/207 |
| 3,454,552 | 7/1969 | Yamaya et al. | 260/155 |
| 3,532,683 | 10/1970 | Sartori | 260/207 |
| 3,542,758 | 11/1970 | Hegar | 260/156 |
| 3,649,162 | 3/1972 | James | 260/157 X |
| 3,700,398 | 10/1972 | Cole | 8/21 B |
| 3,759,893 | 9/1973 | James | 260/149 |

FOREIGN PATENTS OR APPLICATIONS

47-37675  9/1972  Japan .................. 260/178

Primary Examiner—Floyd D. Higel
Attorney, Agent, or Firm—James A. Costello

[57] ABSTRACT

Disclosed herein are biscationic disazo dyes and a process for dyeing nylon therewith at a pH of about 4 to 7. The dyes have good exhaust and buildup on acid-modified BCF nylon fibers as well as good lightfastness and wet fastness on such fibers. The dyes have the formula

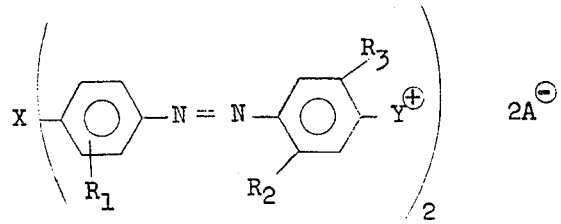

wherein
X is selected from $-CH_2-$, $-C(CH_3)_2-$, $-NH-$, $-O-$, $-OCH_2(CH_2)_{1-2}O-$, $-OCH_2CH(OH)CH_2O-$, $-SO_2-$, $-S-$, $-S-S-$, $-NHCO-$, and $-NHCONH-$;
$R_1$ is selected from H, $CH_3$, $C_2H_5$, Cl, and Br;
$R_2$ is selected from H, alkyl, alkoxy, Cl, NHCO-alkyl, and $NHCOC_6H_5$;
$R_3$ is selected from H, alkyl, and alkoxy;
$Y^+$ is selected from

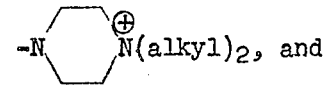

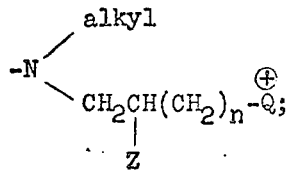

wherein
$n$ is 0 or 1;
Z is H when $n$ is 0 and Z is OH when $n$ is 1;
$Q^+$ is selected from $NR_4R_5R_6$, and $NHCOCH_2NR_4R_5R_6$;
$R_4$ is selected from alkyl, and hydroxyalkyl;
$R_5$ is selected from alkyl, hydroxyalkyl, and cyclohexyl;
$R_6$ is selected from H, alkyl and benzyl;
$R_4$ and $R_5$, optionally, can form an alicyclic ring, or a heterocyclic ring including the nitrogen atom or, together with $R_6$, can form a pyridinium ring;
$A^-$ is an anion.

17 Claims, No Drawings

YELLOW TO ORANGE DISAZO CATIONIC DYES CONTAINING TWO QUATERNARY AMMONIUM GROUPS

BACKGROUND OF THE INVENTION

1. Field of the Invention

This invention concerns biscationic, disazo dyes for dyeing acid-modified nylong styling yarns under neutral to weakly acidic conditions.

2. Description of the Prior Art

With the introduction of acid-modified nylons the range of multicolored effects obtainable on bulk continuous filament BCF nylon styling carpeting has been increased. Acid-modified nylons, which contain sulfonic acid groups on the polymer chain, are dyeable with cationic dyes but have little or no affinity for acid dyes. Thus, a carpet containing two or three nylons of varying affinity for acid dyes (nonacid-modified nylons) and an acid-modified nylon that is not stained by acid dyes can be dyed at will with any combination of shades, including primary colors (those colors that cannot be obtained by combining other colors) side by side on the same carpet. Dyeing methods have been developed so that such carpets can be dyed with acid and cationic dyes in a single dyeing operation.

The following are among the most important considerations when choosing cationic dyes for the acid-modified nylon fibers in nylon styling carpeting and these considerations are met by the novel dyes of this invention:

1. the dyes should have a high degree of lightfastness;
2. they should show a minimum of cross-staining on the unmodified nylon yarns; cross-staining causes dullness, a decrease in shade contrast between yarns of different colors and possibly a decrease in fastness properties;
3. they should have a high degree of wetfastness, to prevent cross-staining of the unmodified nylon yarns when the carpet is shampooed.

SUMMARY OF THE INVENTION

The dyes of this invention have the formula

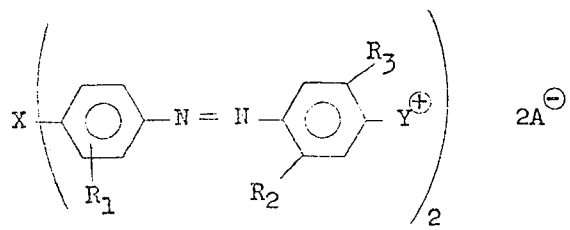

wherein

X is selected from —CH$_2$—, —C(CH$_3$)$_2$—, —NH—, —O—, —OCH$_2$(CH$_2$)$_{1-2}$O—, —OCH$_2$CH(OH)CH$_2$O—, —SO$_2$—, —S—, —S—S—, —NHCO—, and —NHCONH—;

R$_1$ is selected from H, CH$_3$, C$_2$H$_5$, Cl, and Br;

R$_2$ is selected from H, alkyl, alkoxy, Cl, NHCO-alkyl, and NHCOC$_6$H$_5$;

R$_3$ is selected from H, alkyl, and alkoxy;

Y$^+$ is selected from

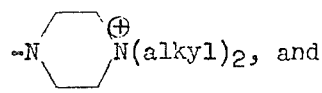 and

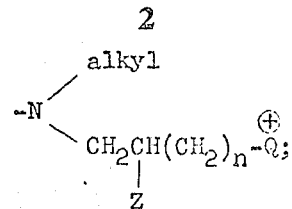

wherein $n$ is 0 or 1;

Z is H when $n$ is 0 and Z is OH when $n$ is 1;

Q$^+$ is selected from NR$_4$R$_5$R$_6$, and NHCOCH$_2$NR$_4$R$_5$R$_6$;

R$_4$ is selected from alkyl, and hydroxyalkyl;

R$_5$ is selected from alkyl, hydroxyalkyl, and cyclohexyl;

R$_6$ is selected from H, alkyl and benzyl;

R$_4$ and R$_5$, optionally, can form an alicyclic ring, or a heterocyclic ring including the nitrogen atom or, together with R$_6$, can form a pyridinium ring;

A$^-$ is an anion.

Herein, the terms alkyl, alkoxy and hydroxyalkyl are meant to include such groups having from 1 to 4 carbon atoms.

In a process for dyeing nylon styling yarns containing acid-modified and unmodified nylon fibers comprising contacting said yarns with a dye dispersed in an aqueous dyebath having a pH of from 3 to 9, the improvement comprising employing a biscationic disazo dye of this invention at a pH of from about 4 to 7, whereby the unmodified nylon fibers are substantially unstained by the dye.

DETAILS OF THE INVENTION

The novel dyes of this invention are prepared by conventional, art-known procedures. An aromatic diamine such as one of those listed in Table 1, having the general structure

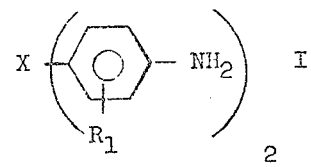

(where X is —CH$_2$—, —C(CH$_3$)$_2$—, —NH—, —O—, —OCH$_2$(CH$_2$)$_{1-2}$O—, —OCH$_2$CH(OH)CH$_2$O—, —SO$_2$—, —S—, —S—S—, —NHCO— or —NHCONH— and R$_1$ is H, CH$_3$, C$_2$H$_5$, Cl or Br) is tetrazotized in aqueous hydrochloric acid at 0°–20°C. by treatment with sodium nitrite and the resulting tetrazonium salt is coupled to two moles, per mole of tetrazonium salt, of a quaternary amine or a tertiary amine salt of the structure

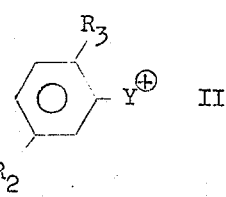

(where R$_2$ is H, alkyl, alkoxy, Cl, NHCOalkyl or NHCO— phenyl; R$_3$ is H, alkyl or alkoxy; Y$^+$ is

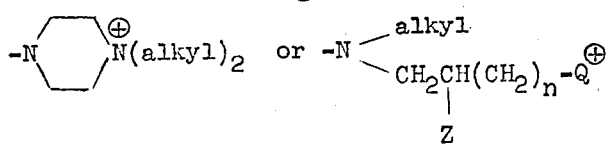

Z is H when *n* is 0 and Z is OH when *n* is 1;

$Q^+$ is $NH_4R_5R_6$ or $NHCOCH_2NR_4R_5R_6$;

$R_4$ is alkyl or hydroxyalkyl;

$R_5$ is alkyl, hydroxyalkyl or cyclohexyl;

$R_6$ is H, alkyl or benzyl; or $R_4$ and $R_5$ together form an alicyclic ring; or $R_4$ and $R_5$ together form a heterocyclic ring including the nitrogen atom; or $R_4$, $R_5$ and $R_6$ together form a pyridinium ring;

$A^-$ is an anion; and alkyl, alkoxy and hydroxyalkyl contain 1–4 carbon atoms.

TABLE 1

Examples of Diamines Useful for Preparing Dyes of this Invention

| | |
|---|---|
| 4,4'-diaminodiphenylmethane | 4,4'-methylenedi(m-toluidine) |
| 4,4'-oxydianiline | 4,4'-methylenebis(2-bromo-aniline) |
| 4,4'-thiodianiline | |
| | 4,4'-sulfonylbis(2-chloro-aniline) |
| 4,4'-dithiodianiline | |
| 4,4'-diaminodiphenylamine | 4,4'-sulfonyldi(o-toluidine) |
| 4,4'-diaminodiphenyl sulfone | 4,4'-dithiodi(m-toluidine) |
| 4,4'-diaminobenzanilide | 4,4'-dithiobis(3-chloro-aniline) |
| N,N'-bis(4-aminophenyl)urea | |
| | 4,4'-thiobis(2-chloroaniline) |
| 1,3-bis(4-aminophenoxy)-2-propanol | N,N'-bis(3-ethyl-4-amino-phenyl)urea |
| 1,3-bis(4-aminophenoxy)-propane | 1,2-bis(4-aminophenoxy)ethane |

The coupling reaction can be carried out by dissolving the coupler in water at room temperature or below (preferably at 5°–20°C.) then slowly adding the tetrazonium salt preparation to it, or vice versa. To increase the reaction rate, the pH of the reaction mixture can be raised to about 3–4 by adding a suitable inorganic salt or base, such as an alkali metal acetate, carbonate, bicarbonate or hydroxide. The resulting dyes of this invention can be salted from solution, if necessary, and isolated by filtration.

Dyes in which the coupler is the salt of a tertiary amine, where $R_6$ is H, can be used in that form or quaternized by any of the agents known for this purpose in the art. Common quaternizing agents include alkyl chlorides, bromides and iodides, benzyl chloride, bromide and sulfate, alkyl sulfates and alkyl p-toluenesulfonates.

For economic reasons, the preferred anion is chloride. However, substitution of other anions does not impair the desirable properties of the subject dyes and would only alter the solubility and the crystalline form of the dyes. Various procedures are available for introducing other anions. For instance, salts such as zinc chloride, sodium iodide or sodium fluoborate can be used as salting agents to precipitate the biscationic dyes from solution as the zinc chloride double salts, the iodides or the fluoborates ($BF_4^-$), respectively. Hydrochloric acid can be replaced with sulfuric or phosphoric acid in the preparative procedure described above to produce the sulfate or phosphate salts of the dyes. Quaternization of the coupler compounds, before or after dye formation, can be effected by any of the agents known in the art for this purpose; thus anions such as bromide, methosulfate or p-toluenesulfonate can be introduced.

The couplers containing a pendant tertiary or quaternized amine group are prepared by methods known in the art. For example, N-alkyl anilines, optionally substituted in the 2- and/or 5-positions, are 1. reacted with ethylene oxide, giving the N-(β-hydroxyethyl) derivatives. Replacement of the hydroxyl group with a halogen atom and subsequent addition of a secondary or tertiary amine gives pendant tertiary amine or quaternary ammonium salts, respectively, 2. reacted sequentially with ethyleneimine, chloroacetyl chloride and a secondary or tertiary amine, giving pendant tertiary amine or quaternary ammonium salts, respectively, 3. reacted sequentially with epichlorohydrin and a secondary or tertiary amine, or, 4. reacted with epichlorohydrin, then with ammonia to replace the terminal chlorine with a primary amine group, and then sequentially with chloroacetyl chloride and a secondary or tertiary amine.

Other useful couplers are prepared by condensing chlorobenzene, optionally substituted in the 2- and/or 5-positions, with piperazine and alkylating or quaternizing with an alkyl halide or sulfate. Examples of couplers that are useful for preparing dyes of this invention are given in Table 2.

TABLE 2

Examples of Couplers Useful for Preparing Dyes of this Invention

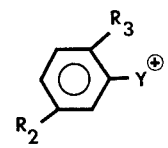

| $R_2$ | $R_3$ | $Y^\oplus$ |
|---|---|---|
| H | H | $-N\begin{smallmatrix}CH_3\\C_2H_4\overset{\oplus}{N}(CH_3)_3\end{smallmatrix}$ |
| $CH_3$ | H | $-N\begin{smallmatrix}C_2H_5\\C_2H_4\overset{\oplus}{N}(C_2H_5)_2CH_3\end{smallmatrix}$ |
| Cl | H | $-N\begin{smallmatrix}C_2H_5\\C_2H_4\overset{\oplus}{N}(C_2H_4OH)_2CH_3\end{smallmatrix}$ |
| $C_2H_5$ | H | $-N\begin{smallmatrix}CH_3\\C_2H_4NHCOCH_2\overset{\oplus}{N}\bigcirc\end{smallmatrix}$ |
| $OCH_3$ | H | $-N\begin{smallmatrix}C_3H_7\\C_2H_4\overset{\oplus}{N}(CH_3)_2-CH_2C_6H_5\end{smallmatrix}$ |
| $OC_4H_9$ | H | $-N\begin{smallmatrix}C_4H_9\\C_2H_4NHCOCH_2\overset{\oplus}{N}(C_3H_7)_3\end{smallmatrix}$ |

TABLE 2 — Continued

Examples of Couplers Useful for Preparing Dyes of this Invention

| $R_2$ | $R_3$ | $Y^{\oplus}$ |
|---|---|---|
| H | H | N-methylpiperazinium (N,N-dimethyl) |
| NHCOCH$_3$ | H | N,N-dipropylpiperazinium |
| CH$_3$ | CH$_3$ | N,N-dimethylpiperazinium |
| CH$_3$ | OCH$_3$ | $-N(C_2H_5)CH_2\overset{\oplus}{C}HCH_2\overset{\oplus}{N}(C_4H_9)_2CH_3$ with OH on middle C |
| NHCOCH$_3$ | H | $-N(C_2H_5)CH_2CH(OH)CH_2NHCOCH_2\overset{\oplus}{N}$(methylpiperidinium) |
| NHCOC$_4$H$_9$ | H | $-N(C_2H_5)C_2H_4\overset{\oplus}{N}(C_2H_5)_3$ |
| C$_4$H$_9$ | H | $-N(CH_3)CH_2CH(OH)CH_2\overset{\oplus}{N}(CH_3)(CH_2C_6H_5)(C_2H_4OH)$ |
| OC$_2$H$_5$ | CH$_3$ | $-N(C_2H_5)CH_2CH(OH)CH_2\overset{\oplus}{N}$(methylpyrrolidinium) |
| H | OC$_4$H$_9$ | $-N(CH_3)CH_2CH(OH)CH_2NHCOCH_2\overset{\oplus}{N}(C_2H_5)_2CH_3$ |
| CH$_3$ | H | $-N(C_4H_9)C_2H_4NHCOCH_2\overset{\oplus}{N}H(CH_3)_2$ |
| NHCOC$_6$H$_5$ | H | $-N(C_2H_5)CH_2CH(OH)CH_2\overset{\oplus}{N}(CH_3)_3$ |
| CH$_3$ | H | $-N(C_2H_5)CH_2CH(OH)CH_2\overset{\oplus}{N}$-morpholinium (with C$_2$H$_5$) |
| H | H | $-N(C_2H_5)C_2H_4\overset{\oplus}{N}(CH_3)_2$-cyclohexyl(CH$_3$) |
| H | H | $-N(C_2H_5)C_2H_4\overset{\oplus}{N}$(methylpiperidinium CH$_3$) |
| H | H | $-N(C_2H_5)C_2H_4\overset{\oplus}{N}(C_2H_4OH)_2C_2H_5$ |
| H | H | $-N(C_2H_5)C_2H_4\overset{\oplus}{N}$-pyridinium |
| H | H | $-N(C_2H_5)C_2H_4\overset{\oplus}{N}(CH_3)_3$ |

Utility

The biscationic disazo dyes of this invention have good exhaust and buildup on acid-modified BCF nylon fibers. Polymers for such fibers are described, for instance, in U.S. Pat. No. 3,184,436, and contain sulfonate groups along the polymer chain which act as dye sites for basic or cationic dyes. In addition, the dyes have good to excellent fastness to light and exhibit an unexpectedly high degree of wetfastness on such fibers. The instant dyes display an almost total lack of affinity for unmodified nylon fibers under neutral to weakly acidic conditions. In other words, at pH 4-7, the biscationic dyes almost completely reserve nylon fibers which do not contain sulfonate groups. This behavior differs from that of known monocationic yellow dyes, which tend to stain unmodified nylon under near-neutral conditions and which display good reserve only under more acidic conditions of pH of 4 or below.

At neutral to weakly acidic conditions, pH 4-7, the subject cationic dyes can be applied to nylon styling carpet in conjunction with neutral-dyeing acid dyes, which have satisfactory exhaust and levelness under these conditions.

Commercial nylon styling carpet usually contains acid-modified nylon and from two to four unmodified nylons of varying acid dye receptivity which are tufted onto a backing in a random pattern to give the desired styling effects.

In order to evaluate cationic and acid dyes for this end-use, however, a test carpeting is used in which the various nylons are tufted onto a backing in discreet bands. The instant dyes were evaluated on a test carpet with the following specifications: Five bands of trilobal, jet-bulked BCF nylon yarns, spun from the nylon flake, are tufted onto a nonwoven polypropylene backing, each band being six tufts in width. The first band is acid-modified, 1300 denier BCF nylon (such as that described in U.S. Pat. No. 3,184,436). The other four bands are unmodified, 3700 denier BCF nylons which have progressively increasing acid dye receptivity by virtue of an increasing amine-end content, which ranges from 5 to more than 100 gram-equivalents of free amine ends per $10^6$ grams of polymer. The specific amine-end range for each band is as follows:

| 1) | 5–25    | gram-equivalents | — | "light-dyeable" with acid dyes |
| 2) | 25–55   | gram-equivalents | — | "medium-dyeable" with acid dyes |
| 3) | 55–100  | gram-equivalents | — | "deep-dyeable" with acid dyes |
| 4) | 100–120 | gram-equivalents | — | "ultradeep-dyeable" with acid dyes |

The deep-dyeing nylons (3) and (4) are disclosed in U.S. Pat No. 3,078,248.

The carpeting is dyed by the procedure used for commercial styling carpet, which can be dyed with acid and cationic dyes in the same dye bath by using as a dyeing assistant a sulfobetaine of the general structure

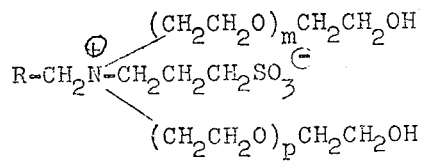

where R = aliphatic hydrocarbon radical of 7–17 carbon atoms; $m = 0-3$; $p = 0-3$; and $m + p < 4$. The preparation of these compounds is described in U.S. Pat. No. 3,280,179. The functions of the sulfobetaine additive are to prevent coprecipitation of the acid and cationic dyes, to enhance the levelness of both classes of dye without suppressing buildup and to minimize cross-staining.

The sulfobetaine dyeing assistant can be used in amounts as low as 0.05% of the weight of the fiber being dyed, but the best results are obtained with 0.2–0.3%. Amounts in excess of 0.5% of the weight of the fiber have led to an increase in cross-staining.

The dyes can be applied to nylon styling yarns by an exhaustion procedure, for instance in a beck, or by a pad-steam procedure, such as is used in continuous dyeing operations. The subject dyes can also be printed onto nylon styling carpeting, with excellent results.

Evaluation of the instant dyes was carried out by dyeing them singly onto nylon test carpeting in the absence of any acid dyes. In this way, the degree of cross-staining on the unmodified nylons is readily apparent. Staining occurs most readily on the unmodified band containing the least number of free amine ends, since this nylon contains the highest density of carboxylic acid end groups, which can act as dye sites for cationic dyes. Staining by cationic dyes can be induced on the "deep-dyeable" and "ultradeep-dyeable" nylons by raising the dyeing pH, or by suitable choice of dye. However, the staining of the "light-dyeable" and "medium-dyeable" bands would then be so bad as to be quite unacceptable. A reasonable candidate will barely stain the first two bands and will leave the higher amine end nylons untouched.

The biscationic dyes described hereinabove have significantly better nonstaining properties on unmodified nylon at pH 4–7 than any known commercial yellow to orange cationic dye.

A major deficiency of available commercial cationic dyes for use on acid-modified nylon in nylon styling yarns has been their tendency to bleed under certain conditions. For example, bleeding can occur when the styling yarn is subjected to shampooing or continual exposure to moisture. With high contrast styling yarn (e.g., carpeting) this results in a "muddying" effect or a staining of the "light-dyeable" component by dye bleeding from the "heavy-dyed" cationic dyeable component.

The properties of the subject dyes make them suitable for carpeting, upholstery, accent rugs, and even for apparel, where it is particularly important to employ dyes which have a high degree of wetfastness and resistance to bleeding.

The presence of an alkyl or alkoxy group in a position ortho (e.g., $R_2$) to the azo linkage in the subject biscationic dyes results in increased pH sensitivity, causing a shade change to occur when dyeing under acidic conditions (e.g., dilute acetic acid). The shade change is readily reversible by treatment with dilute base (e.g., ammonium hydroxide). This phenomenon is, no doubt, attributable to the enhanced basicity of the azo linkage, which facilitates protonation thereon, caused by the effect of the electron releasing character of the ortho alkyl or alkoxy groups.

The preparation of the dyes of this invention are illustrated by the following Examples where parts are given by weight.

EXAMPLE 1

A stirred slurry of 50.1 parts of 4,4'-oxydianiline in 250 parts of water and 203 parts of 10N-hydrochloric acid was cooled to 0°–5°C. and treated with 127 parts of 5N-sodium nitrite solution. The resulting tetrazo compound dissolved completely in the reaction medium. Excess nitrite was destroyed with sulfamic acid.

Next, 353 parts of [3-(N-ethyl-m-toluidino)-2-hydroxypropyl]trimethylammonium chloride were added to the stirred tetrazo solution over a period of 5–10 minutes at 5°–10°C. The pH of the reaction mixture was then adjusted to 3 with 50 parts of sodium acetate and 60 parts of 30% caustic soda solution and the mixture was stirred at 5°–10°C. for 2½ hours, the pH being kept at 3 by adding sodium acetate as necessary.

The mixture was heated to 35°–40°C. and 280 parts of isopropanol were added, followed by a solution of 100 parts of sodium fluoborate in 200 parts of water. The pH was raised to 4 with 30% caustic soda solution, after which the dye began to crystallize from solution. The mixture was stirred at 40°C. for ½ hour and then cooled to room temperature and stirred overnight. The solids were separated by filtration, washed with 600 parts of 1% sodium fluoborate solution and then with 200 parts of water, slurried in 1,000 parts of isopropanol for 40 minutes, isolated by filtration, washed with 800 parts of isopropanol and dried. A yield of 194 parts of a yellow solid was obtained, m.p. 160°–168°C. A visible spectrum of the dye in dimethylacetamide/acetic acid (3/1) showed a peak ($\lambda_{max.}$) at 435 m$\mu$ and an absorptivity ($a_{max.}$) thereat of 78.7 l.g.$^{-1}$ cm.$^{-1}$.

$\lambda_{max.}$ 428 m$\mu$.

Based on the above procedure, the structure of the dye is

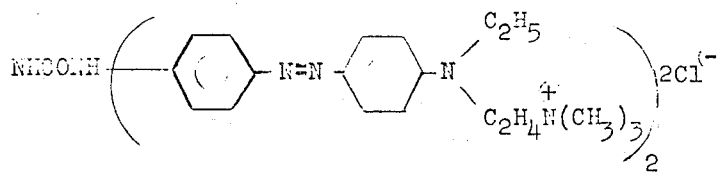

Found: C, 55.7; H, 6.6; N, 12.0; azo N, 6.1
Calc. for $C_{42}H_{60}B_2F_8N_8O_3$: C, 56.1; H, 6.7; N, 12.5; azo N, 6.2

Based on the above procedure and analysis, the structure of the dye is

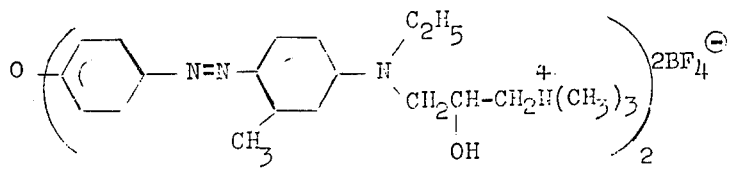

EXAMPLE 2

N,N'-bis(4-aminophenyl)urea (10.2 parts) was diazotized by a procedure similar to that of Example 1. The tetrazonium salt preparation was treated with sulfamic acid to destroy excess nitrite and then clarified by filtration through Hiflo Supercell. To the clarified solution were then added 21.5 parts of [2-(N-ethylanilino) ethyl]trimethylammonium chloride, the reaction mixture being maintained at 5°-10°C. The pH was adjusted to and maintained at 5.5 with sodium acetate for 2 hours. The dye gradually crystallized from the reaction mass, which was then stirred overnight at room temperature. Thirty parts of sodium chloride were added and the solids were isolated by filtration, washed with 100 parts of 10% salt solution and then with 40 parts of isopropanol, and dried, yielding 21.0 parts of reddish-brown powder. In dimethylacetamide/water (4/1), the dye had an absorptivity ($a_{max.}$) of 78.9 l.g.$^{-1}$cm.$^{-1}$ at

EXAMPLE 3

4,4'-Methylenedianiline hydrochloride (6.8 parts) was tetrazotized by a procedure similar to that described in Example 1. The tetrazo preparation was then added to a solution of 16.3 parts of [2-(N-ethyl-m-toluidino)-ethylcarbamoylmethyl]trimethylammonium chloride in 120 parts of water, the temperature of which was 5°-10°C. and the pH of which had been adjusted with acetic acid to 5-5.5. The reaction mass became quite syrupy and crystallized after a few more grams of sodium fluoborate had been added. The mixture was stirred overnight at room temperature and the solids were then isolated by filtration, washed with water, reslurried in water, isolated by filtration and dried. Yield: 20.5 parts. In dimethylacetamide/water (4:1), the dye had $a_{max.}$ 64.0 l.g.$^{-1}$ cm.$^{-1}$ at $\lambda_{max.}$ 431 m$\mu$.

Based on the above procedure, the structure of the dye is

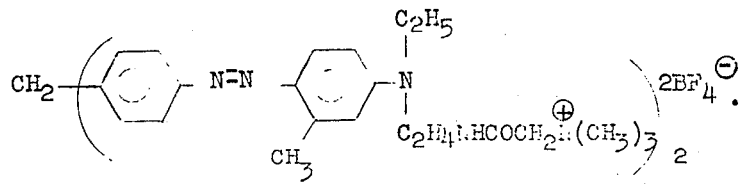

The dyes of the following Examples 4 to 31 were prepared by procedures similar to those of Examples 1–3. Using these same procedures one skilled in the art will be able to employ a tetrazonium salt of a diamine of Table 1 with a coupler of Table 2 to make useful disazo dyes of this invention, of which Examples 1 to 31 are representative.

The dyes of Examples 4, 5, 7, 9, 11, 13, and 15 to 31 have the formula

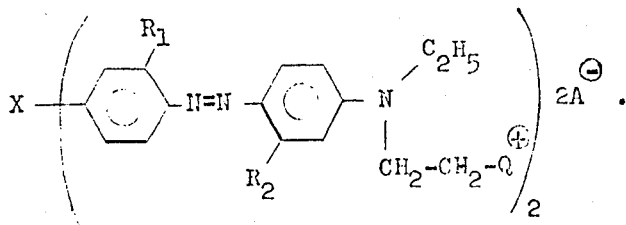

The dyes of Examples 6, 8, 10, 12 and 14 have the formula

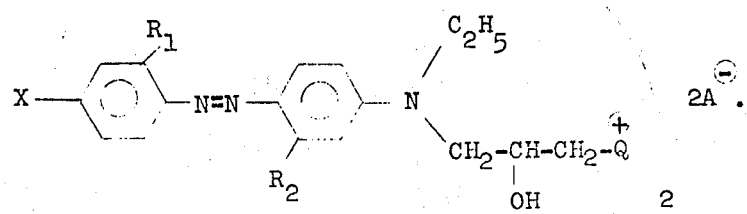

| Example | X | $R_1$ | $R_2$ | $-Q^\oplus$ | $A^\ominus$ | $a_{max}$ (l.g.$^{-1}$ cm.$^{-1}$) | λmax. (mμ) | Shade on Acid-Modified Nylon |
|---|---|---|---|---|---|---|---|---|
| 4 | $-CH_2-$ | H | H | $-\overset{\oplus}{N}(CH_3)_3$ | — | 65.8 | 435 | Yellow |
| 5 | $-CH_2-$ | H | $CH_3$ | $-\overset{\oplus}{N}(C_2H_5)_2CH_3$ | — | 62.0 | 420 | Yellow |
| 6 | $-CH-$ | H | $CH_3$ | $-\overset{\oplus}{N}(CH_3)_3$ | $BF_4^\ominus$ | 71.2 | 432 | Golden Yellow |
| 7 | $-CH_2-$ | $CH_3$ | H | $-\overset{\oplus}{N}(CH_3)_3$ | $BF_4^\ominus$ | 22.9 | 395 | Tan Yellow |
| 8 | $-CH_2-$ | $CH_3$ | H | $-\overset{\oplus}{N}(CH_3)_3$ | $BF_4^\ominus$ | — | 430 | Gold Yellow |
| 9 | $-CH_2-$ | $CH_3$ | $CH_3$ | $-\overset{\oplus}{N}(C_2H_5)_2CH_3$ | $BF_4^\ominus$ | — | 425 | Gold Yellow |
| 10 | $-CH_2-$ | $CH_3$ | $CH_3$ | $-\overset{\oplus}{N}(CH_3)_3$ | $BF_4^\ominus$ | — | 432 | Gold Yellow |
| 11 | $-CH_2-$ | Cl | H | $-\overset{\oplus}{N}(CH_3)_3$ | $BF_4^\ominus$ | 52.9 | 435 | Gold Yellow |
| 12 | $-CH_2-$ | Cl | $CH_3$ | $-\overset{\oplus}{N}(Ch_3)_3$ | $BF_4^\ominus$ | 64.4 | 463 | Orange |
| 13 | $-O-$ | H | H | $-\overset{\oplus}{N}(CH_3)_3$ | $ZnCl_4^\ominus$ | 61.8 | 419 | Yellow |
| 14 | $-O-$ | H | H | $-\overset{\oplus}{N}(CH_3)_3$ | $ZnCl_4^\ominus$ | 70.5 | 450 | Yellow |
| 15 | $-O-$ | H | $CH_3$ | $-NHCOCH_2\overset{\oplus}{N}(CH_3)_3$ | $BF_4^\ominus$ | 59.8 | 455 | Gold Yellow |
| 16 | $-O-$ | H | $CH_3$ | $-\overset{\oplus}{N}(C_2H_5)_2CH_3$ | $Cl^\ominus$ | 60.3 | 422 | Yellow |
| 17 | $-SO_2-$ | H | H | $-\overset{\oplus}{N}(CH_3)_3$ | $BF_4^\ominus$ | 64.9 | 458 | Red Yellow |
| 18 | $-O-$ | H | H | $-\overset{\oplus}{N}(C_2H_5)_3$ | $ZnCl_4^\ominus$ | 63.0 | 420 | Yellow |
| 19 | $-CH_2-$ | H | H | $-\overset{\oplus}{N}(C_2H_5)_3$ | $ZnCl_4^\ominus$ | 52.0 | 420 | Yellow |
| 20 | $-CH_2-$ | H | H | $-\overset{\oplus}{N}(CH_3)_2CH_2C_6H_5$ | $BF_4^\ominus$ | 54.0 | 415 | Yellow |
| 21 | $-O-$ | H | H | $-\overset{\oplus}{N}(CH_3)_2CH_2C_6H_5$ | $Cl^\ominus$ | 64.0 | 420 | Yellow |
| 22 | $-O-$ | H | H | $-\overset{\oplus}{N}(CH_3)_2-\langle CH_3 \text{-cyclohexyl}\rangle$ | $Cl^\ominus$ | 46.5 | 425 | Gold Yellow |
| 23 | $-O-$ | H | H | $-\overset{\oplus}{N}\text{(piperidinyl with CH}_3\text{)}$ | $Cl^\ominus$ | 45.5 | 420 | Yellow |
| 24 | $-O-$ | H | H | $-\overset{\oplus}{N}(C_2H_4OH)_2C_2H_5$ | $Cl^\ominus$ | 58.7 | 420 | Yellow |
| 25 | $-O-$ | H | H | $-\overset{\oplus}{N}\text{(pyridinyl)}$ | $ZnCl_4^\ominus$ | 58.9 | 420 | Yellow |
| 26 | $-SO_2-$ | H | H | $-\overset{\oplus}{N}(CH_3)_2-\langle CH_3 \text{-cyclohexyl}\rangle$ | $Cl^\ominus$ | 53.0 | 460 | Gold Yellow |
| 27 | $-S-$ | H | H | $-\overset{\oplus}{N}\text{(piperidinyl with CH}_3\text{)}$ | $ZnCl_4^\ominus$ | 67.0 | 440 | Gold Yellow |
| 28 | $-S-S-$ | H | H | $-\overset{\oplus}{N}\text{(pyridinyl)}$ | $ZnCl_4^\ominus$ | 70.0 | 430 | Gold Yellow |
| 29 | $-NHC(O)NH-$ | H | H | $-\overset{\oplus}{N}(C_2H_4OH)_2C_2H_5$ | $ZnCl_4^\ominus$ | 48.2 | 425 | Gold Yellow |
| 30 | $-OCH_2CH(OH)CH_2O-$ | H | H | $-\overset{\oplus}{N}(C_2H_5)_3$ | $ZnCl_4^\ominus$ | 45.0 | 410 | Yellow |
| 31 | $-OCH_2CH_2CH_2O-$ | H | H | $-\overset{\oplus}{N}(CH_3)_3$ | $Cl^\ominus$ | 49.8 | 410 | Yellow |

UTILITY EXAMPLES

The following Examples illustrate the dyeing methods for banded test carpet prepared as described hereinbefore. In order to demonstrate the reserve of the bis-cationic dyes on unmodified nylon, they were dyed in the absence of acid dyes.

EXAMPLE 32 - Dyeing of Banded BCF Nylon Carpeting a. Bleach Scour

100 Parts of the carpeting described above were heated for 5 minutes at 80°F. in 4000 parts of water containing

| | |
|---|---|
| sodium perborate | 4 parts |
| trisodium phosphate | 0.25 part |
| a sulfobetaine* | 0.5 part |

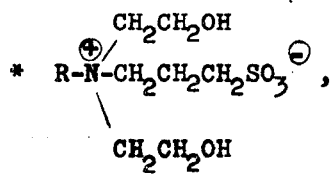

where R = $C_{16}$alkyl (~30%), $C_{18}$alkyl (~30%) and $C_{18}$monounsaturated (~40%). The temperature was raised to 160°F. for 15 minutes and the carpet rinsed in water at 100°F.

b. Dyeing Procedure

The carpeting was added to 4000 parts of water containing

| | |
|---|---|
| the aforementioned sulfobetaine | 1 part |
| the tetrasodium salt of ethylenediamine tetraacetic acid | 0.25 part |
| tetrasodium pyrophosphate | 0.2 part |

The dye bath was adjusted to pH 6 with monosodium phosphate and the temperature raised to 80°F. for 10 minutes. 0.05 Part of the dye of Example 13 was added and, after holding the dye bath at 80°F. for 10 minutes, the temperature was raised at about 2°F. per minute to 210°F. and held at this temperature for 1 hour. The carpeting was rinsed in cold water and dried. The acid-modified band was dyed a deep yellow shade; the unmodified fibers were negligibly stained.

EXAMPLE 33 - Continuous Dyeing of Nylon Styling Carpeting

Using Kusters Equipment as described in "Textile Chemist and Colorist" Jan. 14, 1970, pp. 6–12, nylon styling carpeting containing acid-modified, medium-dyeable and ultradeep-dyeable nylons tufted in a random pattern on a nonwoven polypropylene backing was run through a wet-out bath at 80°F. containing

| | |
|---|---|
| an organic alcohol extended with ethylene oxide | 1.5 g/l |
| a sulfated polyglycol ether | 0.6 g/l |
| Pickup was about 80%. The carpeting was then continuously treated with an aqueous dye bath composition containing the dye of Example 18 | 5 g/l |
| an organic alcohol extended with ethylene oxide | 0.25 g/l |
| a sulfated polyglycol ether | 1.25 g/l |
| a purified natural gum ether | 2 g/l |
| the sulfobetaine described in Example 32 | 5 g/l |
| acetic acid | 3 g/l |
| monosodium phosphate | to adjust pH to about 5 |

The dye bath temperature was 80°F. Pickup was about 200%. The carpeting was then run through a steamer at 212°F., in which the dwell time was 8 minutes. The carpeting was rinsed thoroughly and dried. The acidmodified nylon fibers were dyed a deep yellow shade; the unmodified fibers were negligibly stained.

EXAMPLE 34 - Printing of BCF Nylon Styling Carpet

A sample of nylon styling carpet containing acid-modified, medium-dyeable and ultradeep-dyeable nylons tufted in a random pattern on a nonwoven polypropylene backing was printed with a mixture containing

| | |
|---|---|
| the cationic dye of Example 13 | 5 parts |
| the sulfobetaine described in Example 32 | 0.5 part |
| glacial acetic acid | 5 parts |
| Carregeenin thickener to give the desired viscosity | Water |
| to 100 parts | |

The carpeting was steamed at 212°–220°F. for 10 minutes, rinsed, scoured for 15 minutes at 160°F. in a 0.03% aqueous solution of the condensation product of 20 moles of ethylene oxide with 1 mole of $C_{18}$ alcohol, rinsed and dried. The acid-modified nylon fibers were dyed a deep yellow shade; the unmodified fibers had a negligible stain.

EXAMPLE 35 - Evaluation of Wetfastness

Samples of banded nylon carpeting were dyed (on an equal strength basis), according to the procedure described in Example 32, with
  a. the dyes of Examples 13 and 18, and
  b. a commercially available cationic yellow, C.I. Basic Yellow 45, having the structure

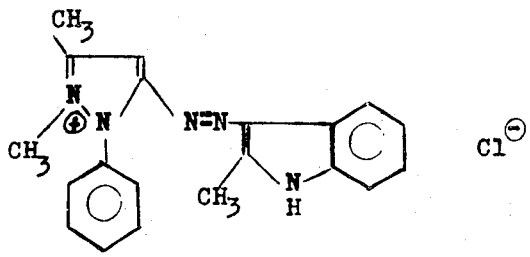

and disclosed in U.S. Pat. No. 3,435,022 as having good wetfastness on polyacrylonitrile fibers.

The amount of bleed and stain onto the "light-dyeable" end of the nylon styling carpet was evaluated for each of the above dyes as follows:

A 6 × 6 inch square of the dyed carpet was treated with 25 ml. of a "hard water" test solution consisting of 2 parts of magnesium sulfate, 2 parts of calcium chloride and 1892 parts of distilled water. The carpet was then air dried for 24 hours. The resultant stain on the "light-dyeable" nylon component was rated using the American Association of Textile Chemists and Colorists Chart for Measuring Transference of Color using a rating scale of from 1 to 5 with the numbers having the following significance:

5 = negligible or no stain
4 = slightly stained
3 = noticeably stained
2 = considerably stained
1 = heavily stained The above steps were repeated until the rating of the stain was equal to 4 or less.

The aforementioned treatment procedure was repeated using 25 ml. of a 30 g/l solution of a commercially available anionic detergent. Results are given in Table 3. They show the superior wetfastness properties of the subject biscationic dyes over the commercial monocationic dye.

TABLE 3

| Dye | Number of Runs X (Staining on "Light-Dyeable" Nylon) | |
|---|---|---|
| | Hard Water | Anionic Detergent |
| Example 13 | 1 × (5) | 1 × (4/3) |
| | 2 × (5) | 2 × (4) |
| | 3 × (5) | 3 × (4) |
| Example 18 | 1 × (5) | 1 × (4/3) |
| | 2 × (5) | 2 × (4) |
| | 3 × (5) | 3 × (4) |
| C.I. Basic Yellow 45 | 1 × (4) | 1 × (3/2) |
| | 2 × (4/3) | 2 × (3) |
| | 3 × (4/3) | 3 × (3). |

The embodiments of the invention in which an exclusive property or priviledge is claimed are defined as follows:

1. A dye having the formula

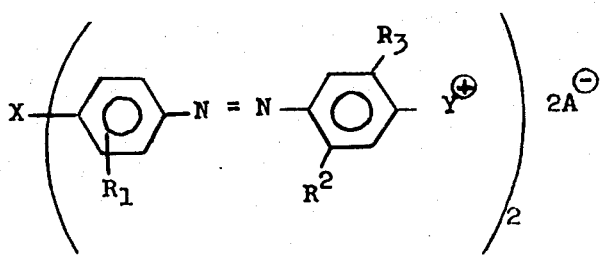

wherein
X is selected from —CH$_2$—, —C(CH$_3$)$_2$—, —NH—, —O—, —OCH$_2$(CH$_2$)$_{1-2}$O—, —OCH$_2$CH(OH)CH$_2$O—, —SO$_2$—, —S—, —S—S—, —NHCO—, and —NHCONH—;

R$_1$ is selected from H, CH$_3$, C$_2$H$_5$, Cl, and Br;

R$_2$ is selected from H, alkyl, alkoxy, Cl, NHCO-alkyl, and NHCOC$_6$H$_5$;

R$_3$ is selected from H, alkyl, and alkoxy;

Y$^⊕$ is [selected from —N⏜N$^⊕$(alkyl)$_2$, and]

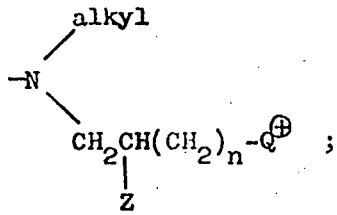

wherein
$n$ is 0 or 1;

Z is H when $n$ is 0 and Z is OH when $n$ is 1;

Q$^+$ is selected from NR$_4$R$_5$R$_6$, and NHCOCH$_2$NR$_4$R$_5$R$_6$;

R$_4$ is selected from alkyl, and hydroxyalkyl;

R$_5$ is selected from alkyl, hydroxyalkyl, and cyclohexyl;

R$_6$ is selected from H, alkyl and benzyl;

R$_4$ and R$_5$ form an alicyclic ring;

A$^-$ is an anion; the alkyl, alkoxy, NHCOalkyl and hydroxyalkyl substituents refer to such substituents having 1 to 4 carbon atoms.

2. A dye according to claim 1 wherein Y$^+$ is,

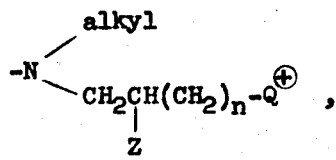

and wherein Q$^+$, Z and $n$ are as defined in claim 1.

3. A dye according to claim 2,

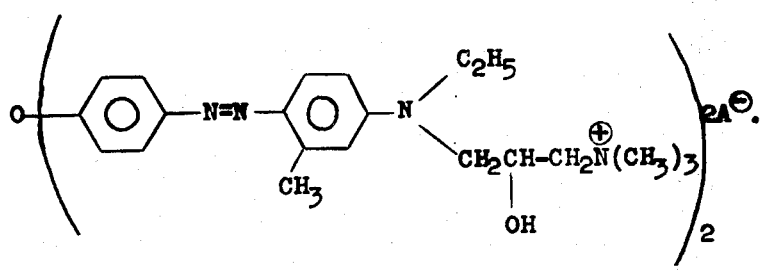

4. A dye according to claim 3, wherein A$^-$ is BF$_4^-$

5. A dye according to claim 2,

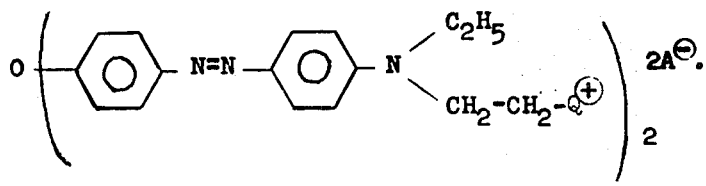

6. A dye according to claim 5,

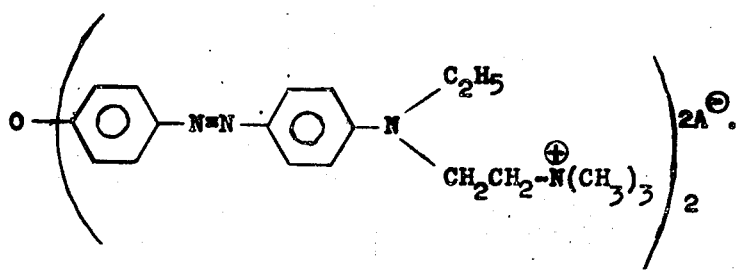

7. A dye according to claim 6 wherein 2A$^-$ is ZnCl$_4^=$

8. A dye according to claim 5,

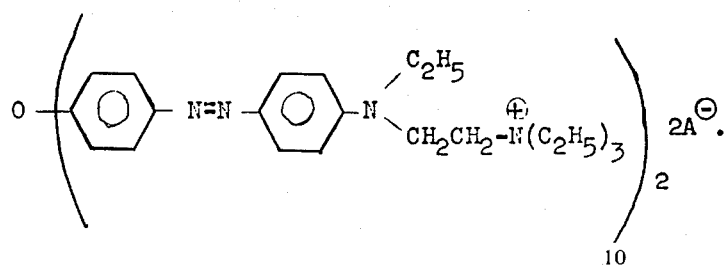
9. A dye according to claim 8 wherein 2A⁻ is ZnCl₄⁼.
10. A dye according to claim 5,
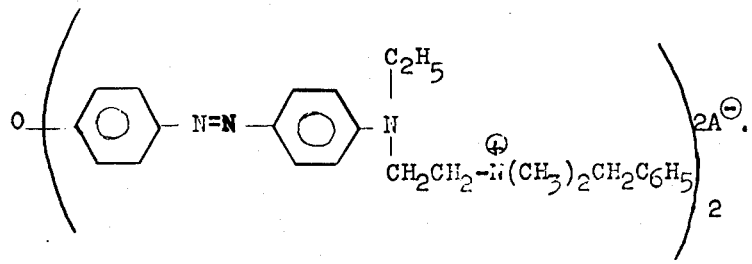
11. A dye according to claim 10 wherein A⁻ is Cl⁻.
12. A dye according to claim 2,
13. A dye according to claim 12, wherein 2A⁻ is ZnCl₄⁼.
14. A dye according to claim 2,
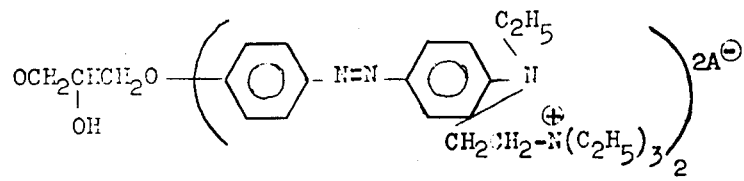
15. A dye according to claim 14 wherein 2A⁻ is ZnCl₄⁼.
16. A dye according to claim 2,
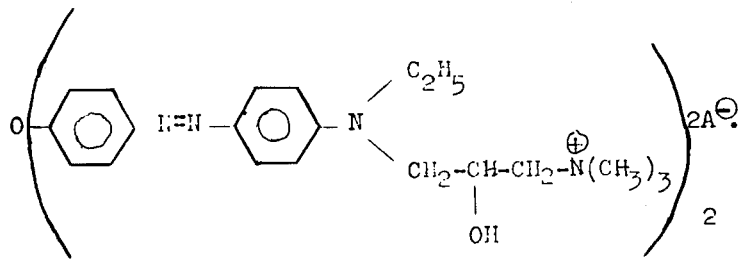
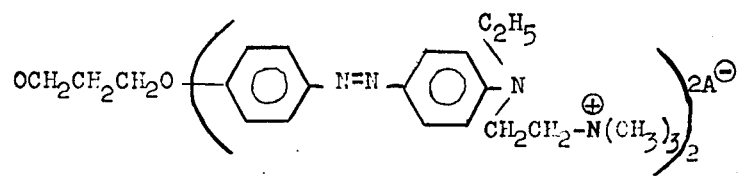
17. A dye according to claim 16 wherein A⁻ is Cl⁻.
* * * * *